United States Patent
Nagata et al.

(10) Patent No.: US 7,612,777 B2
(45) Date of Patent: Nov. 3, 2009

(54) ANIMATION GENERATING APPARATUS, ANIMATION GENERATING METHOD, AND ANIMATION GENERATING PROGRAM

(75) Inventors: Hisanori Nagata, Tokyo (JP); Kenji Kameda, Tokyo (JP); Natsuo Koda, Kanagawa (JP)

(73) Assignee: Sony Corporation, Tokyo (JP)

( * ) Notice: Subject to any disclaimer, the term of this patent is extended or adjusted under 35 U.S.C. 154(b) by 121 days.

(21) Appl. No.: 11/114,030

(22) Filed: Apr. 26, 2005
(Under 37 CFR 1.47)

(65) Prior Publication Data

US 2006/0284879 A1    Dec. 21, 2006

(30) Foreign Application Priority Data

May 13, 2004  (JP) ............................. 2004-143014

(51) Int. Cl.
*G06T 15/00*   (2006.01)
*G06T 13/00*   (2006.01)

(52) U.S. Cl. ........................ 345/473; 345/474
(58) Field of Classification Search .......... 345/473–474
See application file for complete search history.

(56) References Cited

U.S. PATENT DOCUMENTS

| | | | | |
|---|---|---|---|---|
| 5,161,886 A * | 11/1992 | De Jong et al. | ............. | 701/209 |
| 5,528,735 A * | 6/1996 | Strasnick et al. | ............. | 345/427 |
| 5,742,924 A * | 4/1998 | Nakayama | .................. | 701/208 |
| 5,793,310 A * | 8/1998 | Watanabe et al. | ...... | 340/995.14 |
| 6,169,552 B1 * | 1/2001 | Endo et al. | .................. | 345/427 |
| 6,226,008 B1 * | 5/2001 | Watanabe et al. | ........... | 345/427 |
| 6,346,938 B1 * | 2/2002 | Chan et al. | ................... | 345/419 |
| 6,377,264 B1 * | 4/2002 | Iizuka et al. | ................ | 345/473 |
| 6,628,278 B1 * | 9/2003 | Ritter | ......................... | 345/419 |
| 6,670,957 B2 * | 12/2003 | Fukuda | ....................... | 345/473 |
| 6,714,861 B2 * | 3/2004 | Okude et al. | ................ | 701/208 |
| 6,795,082 B2 * | 9/2004 | Wakabayashi | .............. | 345/582 |
| 7,002,578 B1 * | 2/2006 | Ritter | ......................... | 345/427 |
| 7,039,521 B2 * | 5/2006 | Hortner et al. | .............. | 701/211 |
| 2004/0169653 A1 * | 9/2004 | Endo et al. | .................. | 345/427 |
| 2005/0071306 A1 * | 3/2005 | Kruszewski et al. | .......... | 706/47 |
| 2005/0195184 A1 * | 9/2005 | Yoshiike | ..................... | 345/419 |
| 2006/0033741 A1 * | 2/2006 | Royz et al. | .................. | 345/473 |

FOREIGN PATENT DOCUMENTS

| | | |
|---|---|---|
| JP | 10-143066 | 5/1998 |
| JP | 2003-135844 | 5/2003 |

OTHER PUBLICATIONS www.dictionary.com, keyword search "along," retrieved Mar. 1, 2009.*

* cited by examiner

*Primary Examiner*—Ulka Chauhan
*Assistant Examiner*—Crystal Murdoch
(74) *Attorney, Agent, or Firm*—Oblon, Spivak, McClelland, Maier & Neustadt, L.L.P.

(57) ABSTRACT

An animation generating apparatus for generating a three-dimensional animation tracking a moving object includes a camera parameter setting section setting a point of regard and a point of view based on a current position of the moving object using route data indicating a route of the moving object so that the point of regard is located on the route and the point of view is located behind the point of regard along the route, and a rendering processor generating an image by retrieving necessary rendering data from three-dimensional map data based on the point of regard and point of view set by the camera parameter setting section.

20 Claims, 9 Drawing Sheets

ANIMATION GENERATING APPARATUS, ANIMATION GENERATING METHOD, AND ANIMATION GENERATING PROGRAM

CROSS REFERENCES TO RELATED APPLICATIONS

The present invention contains subject matter related to Japanese Patent Application JP 2004-143014 filed in the Japanese Patent Office on May 13, 2004, the entire contents of which are incorporated herein by reference.

BACKGROUND OF THE INVENTION

1. Field of the Invention

The present invention relates to an animation generating apparatus, an animation generating method, and an animation generating program for generating a three-dimensional (3D) animation containing scenes tracking a moving object. More specifically, the present invention relates to an animation generating apparatus, an animation generating method, and an animation generating program for generating a 3D animation by a simple process when a route of a moving object is preset.

2. Description of the Related Art

With recent advances in computer graphics (CG) technologies for 3D image representation using CG, CG technologies have been generally used in vehicle navigation systems, computer games, etc. For example, in a vehicle navigation system, the CG technologies allow a user to recognize the relationship between the current vehicle position and the position of a 3D structure, such as a nearby building or an interchange, in a three-dimensional manner.

Some of the recent vehicle navigation systems have a function for magnifying and displaying a map of an area around an intersection or environmental conditions of the area to inform a vehicle driver of the route ahead before the vehicle turns at the intersection. This intersection magnification function is enabled, for example, when the vehicle approaches within a predetermined distance of an intersection or when a searched route is simulated.

A typical intersection magnification function is used to simply magnify and display a two-dimensional map of an area around an intersection and a route. A recent intersection magnification function allows dynamic views of a road and nearby buildings using a 3D CG animation when the vehicle is passing an intersection and after the vehicle has passed the intersection. Such an animation may be viewed as a sub-image (see, for example, Japanese Unexamined Patent Application Publication No. 2003-337032, paragraphs [0007] to [0008] and FIG. 1).

The 3D CG animation-based intersection magnification function may require a large amount of data and high processing performance. In a vehicle navigation system of the related art, therefore, the intersection magnification function is enabled only for a predetermined important intersection. In order to display an animation, animation parameters of major intersections are generated in advance separately from a route, and images are rendered based on the animation parameters. Alternatively, a plurality of still images of intersections are created in advance, and these still images are reproduced.

SUMMARY OF THE INVENTION

However, it is now desirable to enable the intersection magnification function for as many intersections as possible. It is also desirable to display a sophisticated animation in which images are flexibly displayed. For example, images change consecutively as the vehicle is turning at an intersection in a manner similar to the scenes viewed in front of the vehicle, and the height of the point of view is changeable.

In the above-described image rendering method based on animation parameters or still image data generated in advance for individual intersections, the amount of data to be processed may increase depending upon the number of intersections. Moreover, a large amount of data is necessary for an animation in which images consecutively change along with traveling through an intersection, and the height of the point of view is fixed in advance and is not changeable.

Although it is desirable to create magnified views of any intersection using 3D map data used for standard route views, it is necessary to separately generate a trajectory of movement of a vehicle and a trajectory of movement of a point of view when the vehicle travels through an intersection. For example, the publication noted above discloses that a point of view is located on a line extending in the direction opposite to the direction of the route past an intersection and a point of regard (or a point to be observed) and the point of view are moved so that the angle defined between the position of the vehicle and the point of view with respect to a reference point located at the intersection is maintained constant. Thus, complex computation is necessary to determine the point of view and the point of regard.

The foregoing problems are involved with not only vehicle navigation systems but also animation display systems using cameras tracking a moving object on a screen with various movements, such as 3D games and human navigation systems.

Therefore, it is desirable to provide an animation generating apparatus for efficiently setting a point of view and a point of regard and automatically generating a 3D animation containing scenes tracking a moving object.

It is further desirable to provide an animation generating method for efficiently setting a point of view and a point of regard and automatically generating a 3D animation containing scenes tracking a moving object.

It is further desirable to provide an animation generating program for efficiently setting a point of view and a point of regard and automatically generating a 3D animation containing scenes tracking a moving object.

According to an embodiment of the present invention, there is provided an animation generating apparatus for generating a three-dimensional animation tracking a moving object. The animation generating apparatus includes the following elements. Camera parameter setting means sets a point of regard and a point of view based on a current position of the moving object using route data indicating a route of the moving object so that the point of regard is located on the route and the point of view is located behind the point of regard along the route. Rendering means generates an image by retrieving necessary rendering data from three-dimensional map data based on the point of regard and point of view set by the camera parameter setting means.

In the animation generating apparatus, the camera parameter setting means determines a point of regard and a point of view, and the rendering means retrieves necessary rendering data from three-dimensional map data based on the point of regard and the point of view to generate images in the animation. The point of regard determined by the camera parameter setting means is located on the route of the moving object, and the point of view determined by the camera parameter setting means is located behind the point of regard along the route. Thus, the two-dimensional coordinates of the point of regard and the point of view coincide with coordinates of points on the route. The point of regard and the point of view can easily be determined once the route data of the moving object is given.

According to another embodiment of the present invention, there is provided an animation generating method for generating a three-dimensional animation tracking a moving object. The method includes the steps of setting a point of regard and a point of view based on a current position of the moving object using route data indicating a route of the moving object so that the point of regard is located on the route and the point of view is located behind the point of regard along the route, and generating an image by retrieving necessary rendering data from three-dimensional map data based on the set point of regard and the set point of view.

In the animation generating method, a point of regard and a point of view are determined, and necessary rendering data is retrieved from three-dimensional map data based on the determined point of regard and the determined point of view to generate images in the animation. The point of regard is located on the route of the moving object, and the point of view is located behind the point of regard along the route. Thus, the two-dimensional coordinates of the point of regard and the point of view coincide with coordinates of points on the route. The point of regard and the point of view can easily be determined once the route data of the moving object is given.

Since the point of regard and the point of view are set by a simple process once route data of a moving object is given, a 3D animation tracking even a moving object moving on a bent or curved route can automatically be generated without using a special process or special rendering data. In application to navigation systems or computer games, therefore, high-quality images more exact to the real scenes can be displayed.

DESCRIPTION OF THE PREFERRED EMBODIMENTS

Embodiments of the present invention will now be described in detail with reference to the drawings.

First, the outline of the present invention will be described below.

Figure 1:
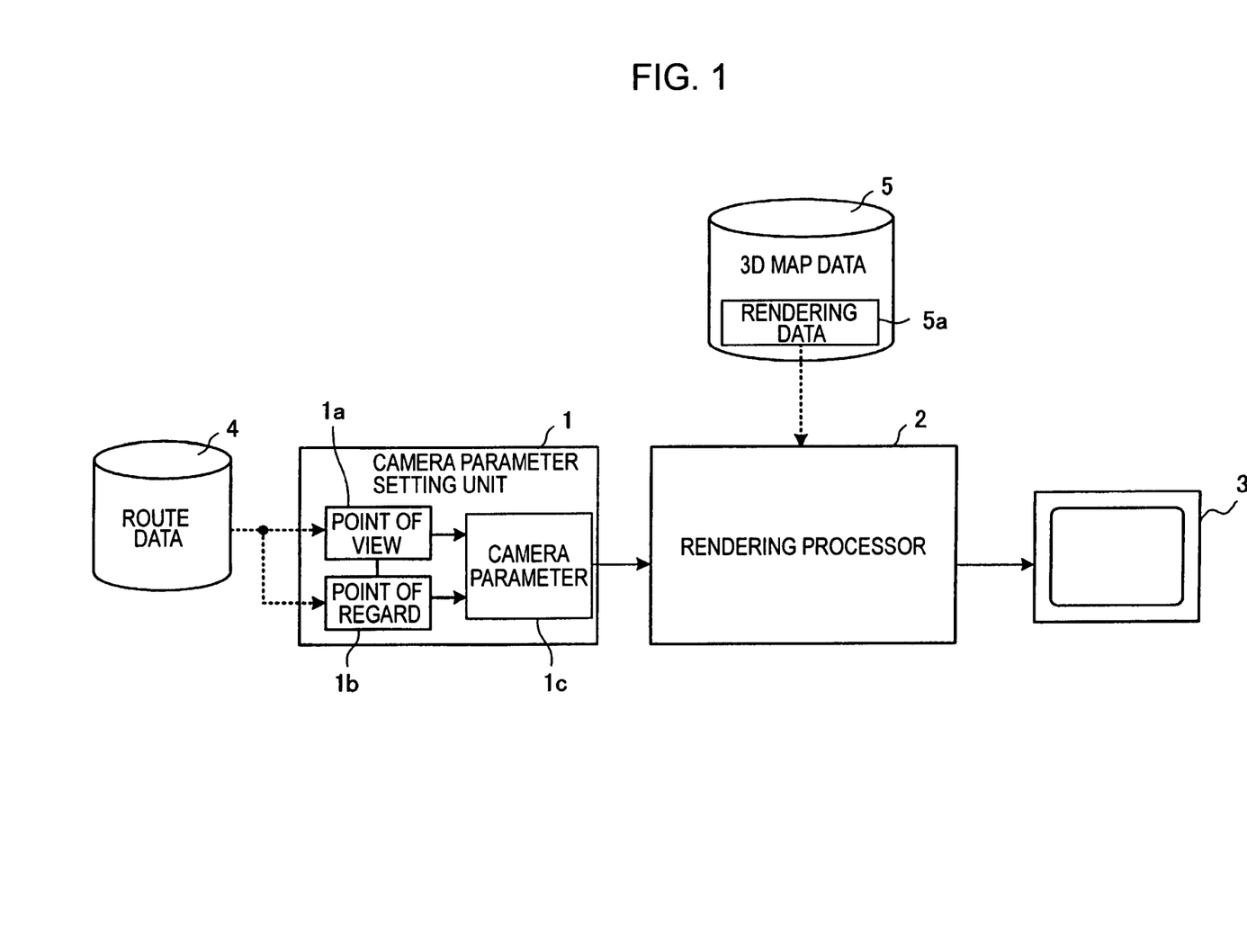
FIG. 1 is a block diagram of an animation generating apparatus according to an embodiment of the present invention.

FIG. 1 is a block diagram showing main functions of an animation generating apparatus according to an embodiment of the present invention.

The animation generating apparatus generates a 3D animation containing images captured by a camera tracking a moving object. As shown in FIG. 1, the animation generating apparatus includes a camera parameter setting unit 1 and a rendering processor 2. The rendering processor 2 is connectable to a monitor 3. Route data 4 indicating a route of the moving object and 3D map data 5 of an area in which the moving object moves are supplied to the camera parameter setting unit 1 and the rendering processor 2. For example, the route data 4 and the 3D map data 5 are stored in a storage device incorporated in the animation generating apparatus.

The camera parameter setting unit 1 determines a point of view 1a and a point of regard (point to be observed) 1b when tracking the moving object, and generates a camera parameter 1c necessary for specifying a display area based on the point of view 1a and the point of regard 1b. The camera parameter setting unit 1 supplies the camera parameter 1c to the rendering processor 2. When the moving object moves on a route designated by the route data 4, the camera parameter setting unit 1 determines the point of view 1a and the point of regard 1b on the route based on the route data 4 depending upon the current position of the moving object on the designated route. Specifically, as described below with reference to FIG. 2, the point of regard 1b is located on the route, and the point of view 1a is located on the same route behind the point of regard 1b. The point of regard 1b may be located at a predetermined height from the route.

The rendering processor 2 renders an image corresponding to the camera parameter 1c supplied from the camera parameter setting unit 1 using the 3D map data 5, and displays the image on a monitor 3. Specifically, the rendering processor 2 specifies a display area on a 3D map based on the camera parameter 1c, and retrieves rendering data 5a necessary for rendering an object in the display area from the 3D map data 5 to generate an image. The camera parameters 1c are sequentially generated along with the movement of the moving object, and images are generated based on the camera parameters 1c to produce an animation.

Figure 2:
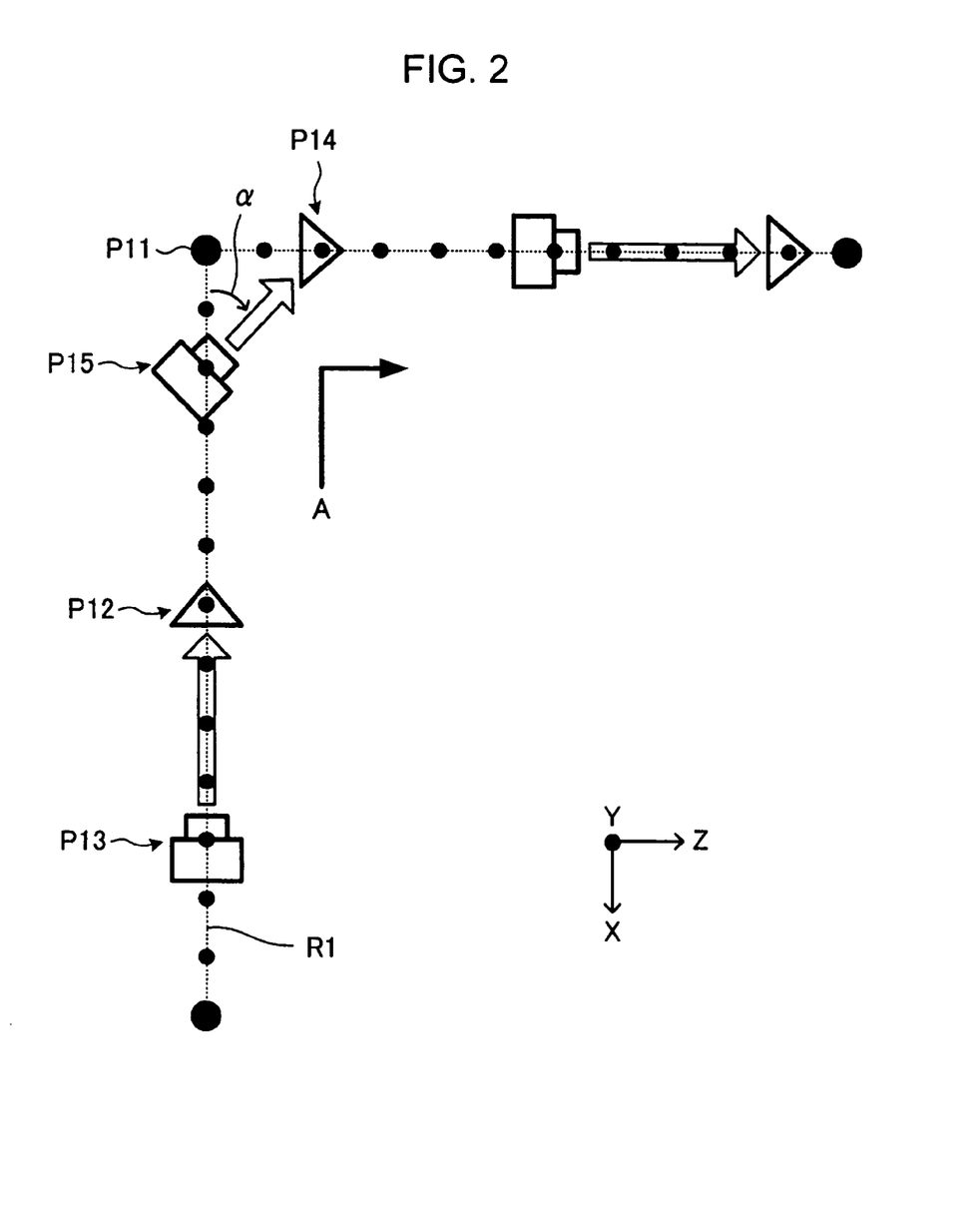
FIG. 2 is a diagram showing a method for setting a point of view and a point of regard.

FIG. 2 shows a method for setting a point of view and a point of regard.

Referring to FIG. 2, a route R1 is bent at a point P11, and a moving object moves on the route R1 in the manner indicated by an arrow A. In FIG. 2, the route R1 is divided by a plurality of points, and route data is represented by a group of coordinates of the points. The points may be designated as points by which the route R1 is divided at certain intervals or may be designated as points at which the moving object arrives at certain time intervals.

In order to generate images tracking the moving object moving on the route R1, the point of regard of the camera is moved on the route R1 so as to be substantially set to the position of the moving object, and the position of the camera, i.e., the point of view, is set to a point behind the point of regard. According to an embodiment of the present invention, the point of view is set to a position along the route R1 behind the point of regard.

In the example shown in FIG. 2, the point of view is set at a point four segments behind the point of regard. For example, when the moving object is at a point P12, the point of regard is set at the point P12, and the point of view is set at a point P13 four segments behind the point P12. In linear segments until the moving object arrives at the point P11, the direction from the point of view to the point of regard (hereinafter referred to as a "camera direction") is along the route R1.

After the traveling direction of the moving object changes after the point P11, the point of view is still set at a point four segments behind the point of regard on the route R1, and therefore the moving directions of the point of regard and the point of view differ from each other immediately after the traveling direction of the moving object changes. The camera direction changes with the movement of the moving object. For example, when the moving object is at a point P14, the point of regard is set at the point P14, and the point of view is set at a point P15 before the point P11. An angle α is defined between the camera direction from the point of view to the point of regard and the route R1 up to the point P11, where α>0. The angle α increases as the moving object moves, and the camera direction is along the direction of the route R1 from the point P11.

Accordingly, the point of view and the point of regard are set on the route R1. Therefore, once route data is given, the point of view and the point of regard can automatically be set without generating trajectories of movement of the point of view and the point of regard separately from the route R1 of the moving object. Based on the point of view and the point of regard that are set by this simple process, a camera parameter causing the camera direction to be gradually changed while tracking a moving object having a varying traveling direction can be generated. Thus, a real-time animation can be produced while changing the camera direction.

Figure 3:
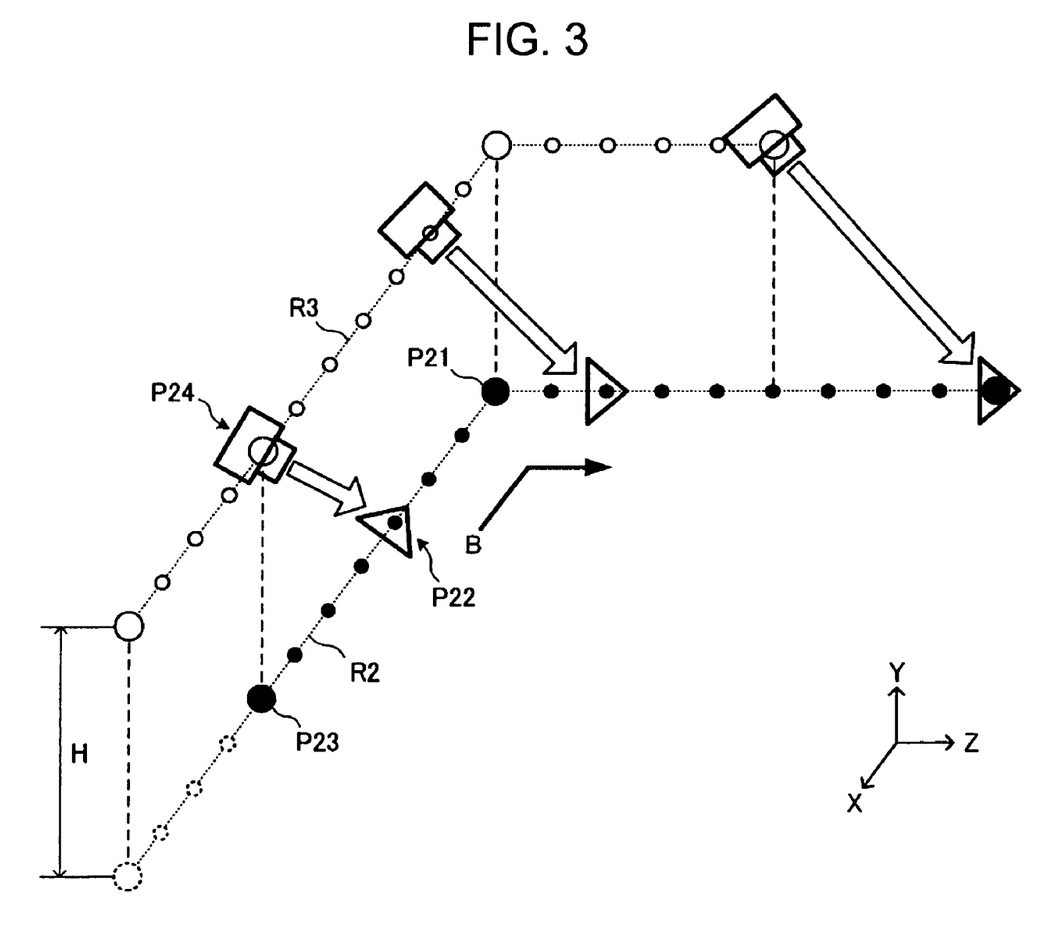
FIG. 3 is a diagram showing another method for setting a point of view and a point of regard.

FIG. 3 shows another method for setting a point of view and a point of regard.

The camera parameter setting unit 1 may set a point of view at a certain height from a position behind a point of regard on a route. The 3D map data 5 and the route data 4 preferably include height information.

Referring to FIG. 3, a route R2 is bent at a point P21, and a moving object moves on the route R2 in the manner indicated by an arrow B. When the point of view is set at a position a height H from the route R2, a route R3 at the height H above the route R2 is defined as a trajectory of movement of the point of view.

Similarly to FIG. 2, the two-dimensional coordinates (X-Z coordinates) of the point of view are those of a position behind (in FIG. 3, a position four segments behind) the point of regard along the route R2, and the height coordinate (Y coordinate) of the point of view is determined by adding the height H to the coordinate value of the point of regard. For example, when the moving object is at a point P22, the point of regard is set at the point P22, and the point of view is set at a point P24 at the height H above a point P23 four segments behind the point P22. Therefore, the point of view and the point of regard are determined by simple computation when the route data of the route R2 is given.

The point of view and the point of regard are set in this way. When the traveling direction of the moving object changes at the point P21, the camera direction from the point of view to the point of regard also gradually changes with the movement of the moving object. A camera parameter causing the camera direction to gradually change is generated in order to produce a real-time animation while changing the camera direction. The height H of the point of view may arbitrarily be set depending upon the movement of the moving object. For example, in a navigation system, in a view in front of the vehicle from a point of view higher than the ground level, called a bird's eye view, the height of the point of view can easily be changed, thus providing highly flexible and usable views. In computer games, various image expressions of vertical and horizontal movements of a moving object can be provided, leading to high entertainment.

Although FIGS. 2 and 3 show bent routes, a curved route may also be used. Therefore, when an animation containing scenes tracking a moving object is created, a camera parameter can easily be set with low computational load irrespective of the route configuration once route data of the moving object is given. Thus, a real-time animation tracking a moving object can be created using existing route data or 3D map data.

Since the point of view is set behind the point of regard, there is less possibility of obstacles, such as buildings, between the point of view and the moving object. The shorter the distance between the point of view and the moving object, the lower the possibility of obstacles.

A vehicle navigation system having an intersection magnification function according to an embodiment of the present invention will now be described. First, the intersection magnification function will be described below.

Figure 4:
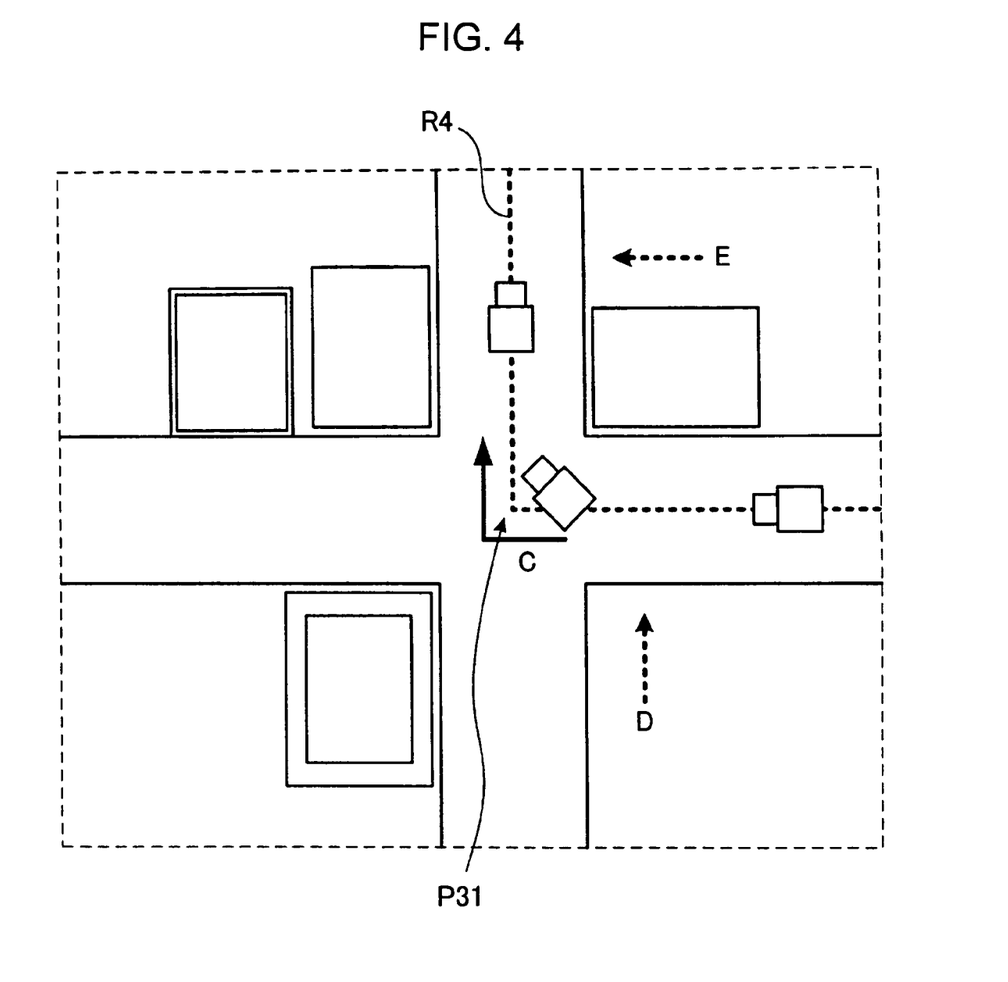
FIG. 4 is a map view of an area near an intersection for which an intersection magnification function is enabled.

FIG. 4 is a map view of an area near an intersection for which the intersection magnification function is enabled.

The intersection magnification function informs a vehicle driver of environmental conditions of an area around an intersection through which the vehicle is traveling using a magnified CG image. For example, the intersection magnification function is enabled when a route to a destination is searched for and the vehicle approaches within a predetermined distance of the intersection or when the searched route is simulated in advance.

Referring to FIG. 4, an intersection P31 is located on a map view, and a route R4 extending upwards through the intersection P31 from the right, as viewed in FIG. 4, as indicated by an arrow C, is searched for. In this case, images viewed in front of the vehicle are sequentially displayed to produce a 3D animation for a period of time from when the vehicle approaches the intersection P31 until it has passed the intersection P31.

FIGS. 5A to 5D are animation views when the vehicle approaches an intersection and the intersection magnification function is enabled.

Figure 5A:
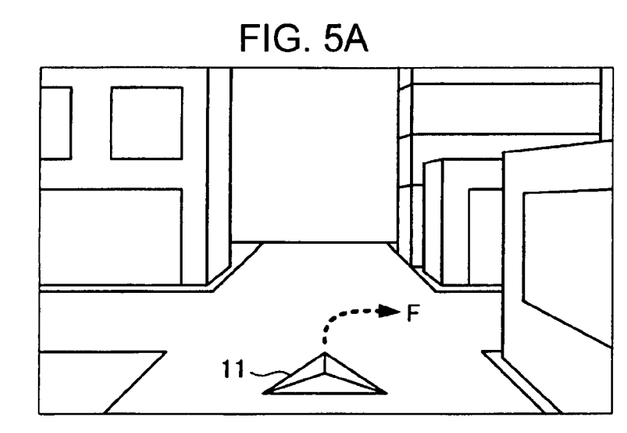
FIGS. 5A to 5D are animation views using the intersection magnification function.
Figure 5B:
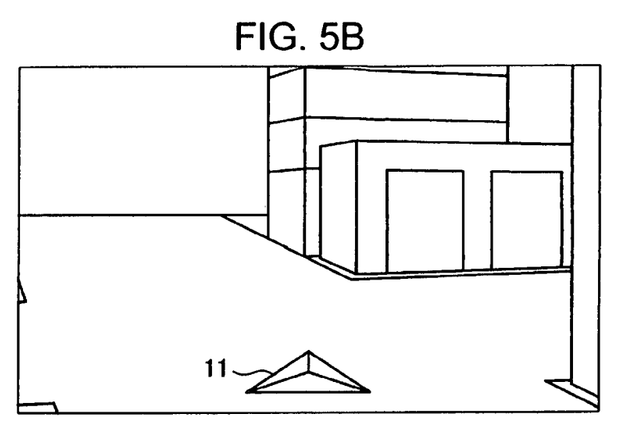
Figure 5C:
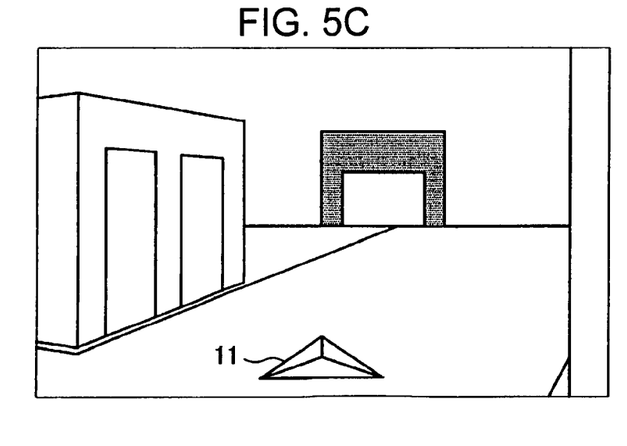
Figure 5D:
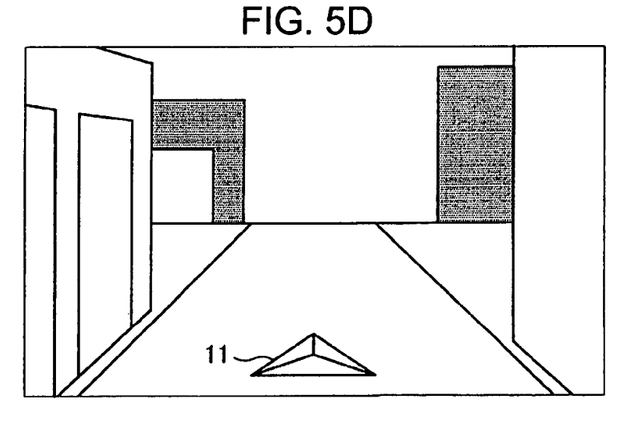

As shown in FIGS. 5A to 5D, an avatar 11 indicating the position of the vehicle is located at a center lower portion of each view. The view shown in FIG. 5A is obtained when the vehicle is near the intersection, and the view shown in FIG. 5B is obtained when the vehicle is to turn to the right, as indicated by an arrow F shown in FIG. 5A, at the intersection. The view shown in FIG. 5C is obtained when the vehicle is still turning at the intersection, and the view shown in FIG. 5D is obtained when the vehicle has passed the intersection.

When these views are displayed, typically, animation parameters for generating images traveling through the intersection or data indicating a plurality of still images is generated in advance separately from data used for standard route views, and images are displayed based on the animation parameters or the still image data.

In contrast, according to an embodiment of the present invention, a point of view and a point of regard are set based on route data for use in traveling through an intersection. Thus, a continuous animation traveling through a desired intersection can be displayed with low computational load for setting these points, without specific data to the intersection, using standard 3D map data for traveling on the route.

Changing the height of the point of view when a vehicle enters an intersection and after the vehicle has passed the intersection will be described with reference to FIGS. 6A and 6B.

As described above with reference to FIG. 3, the height of the point of view can be changed to produce a high-usability entertaining animation. FIGS. 6A and 6B are illustrations of changes in the height of the point of view when the vehicle enters the intersection P31 shown in FIG. 4 and after the vehicle has passed the intersection P31, respectively. FIGS. 6A and 6B show areas near the intersection P31 as viewed from the directions indicated by arrows D and E shown in FIG. 4, respectively.

Figure 6A:
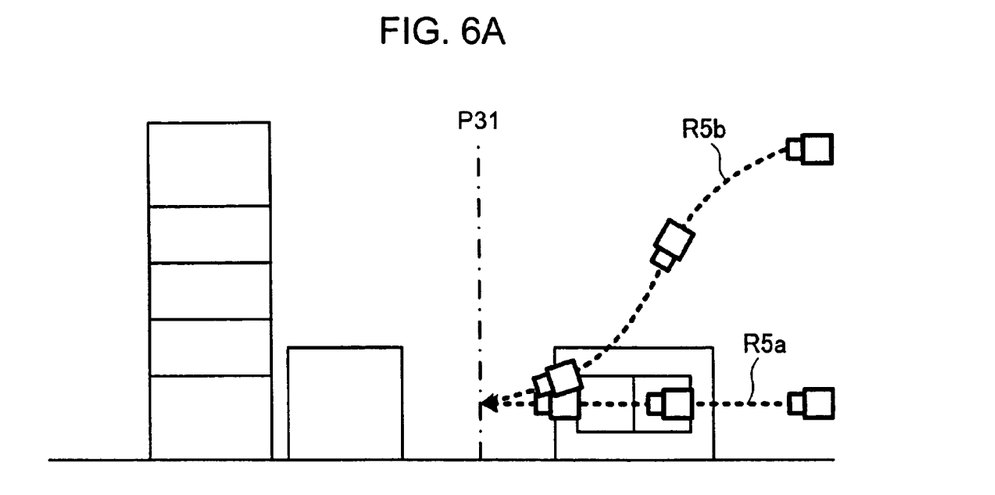
FIGS. 6A and 6B are illustrations of changes in the height of the point of view when a vehicle enters an intersection and after the vehicle has passed the intersection, respectively.
Figure 6B:
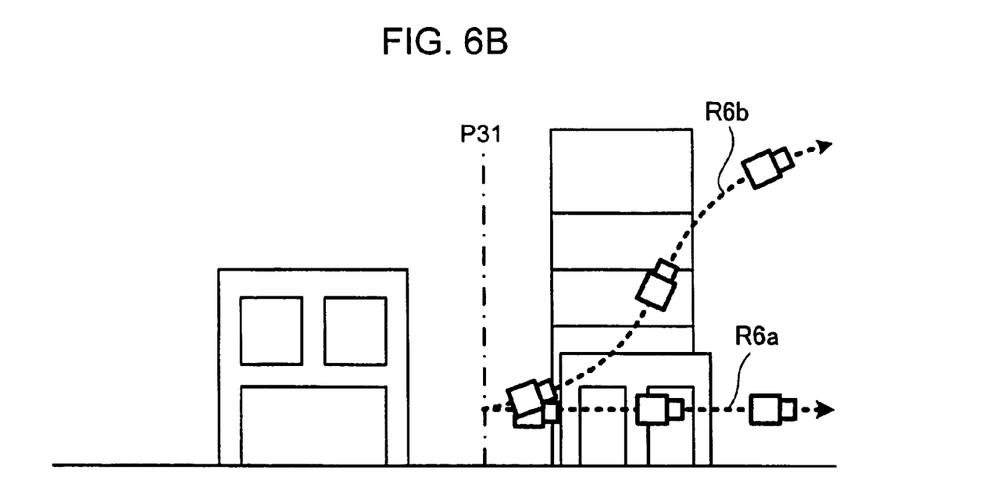

A view obtained by setting the point of view at substantially the same height as the height of a driver's eye is referred to as a "driver's view", and the point of view moves along trajectories R5a and R6a shown in FIGS. 6A and 6B. A view obtained by setting the point of view at a higher position is referred to as a "bird's eye view". Several view modes can be used for a desired intersection using existing 3D map data in a view mode, e.g., a "bird-to-driver mode" in which, as indicated by a trajectory R5b shown in FIG. 6A, the point of view moves down as the vehicle approaches the intersection P31, or a "driver-to-bird mode" in which, as indicated by a trajectory R6b shown in FIG. 6B, the point of view moves up as the vehicle moves away from the intersection P31.

A vehicle navigation system according to an embodiment of the present invention will now be described.

Figure 7:
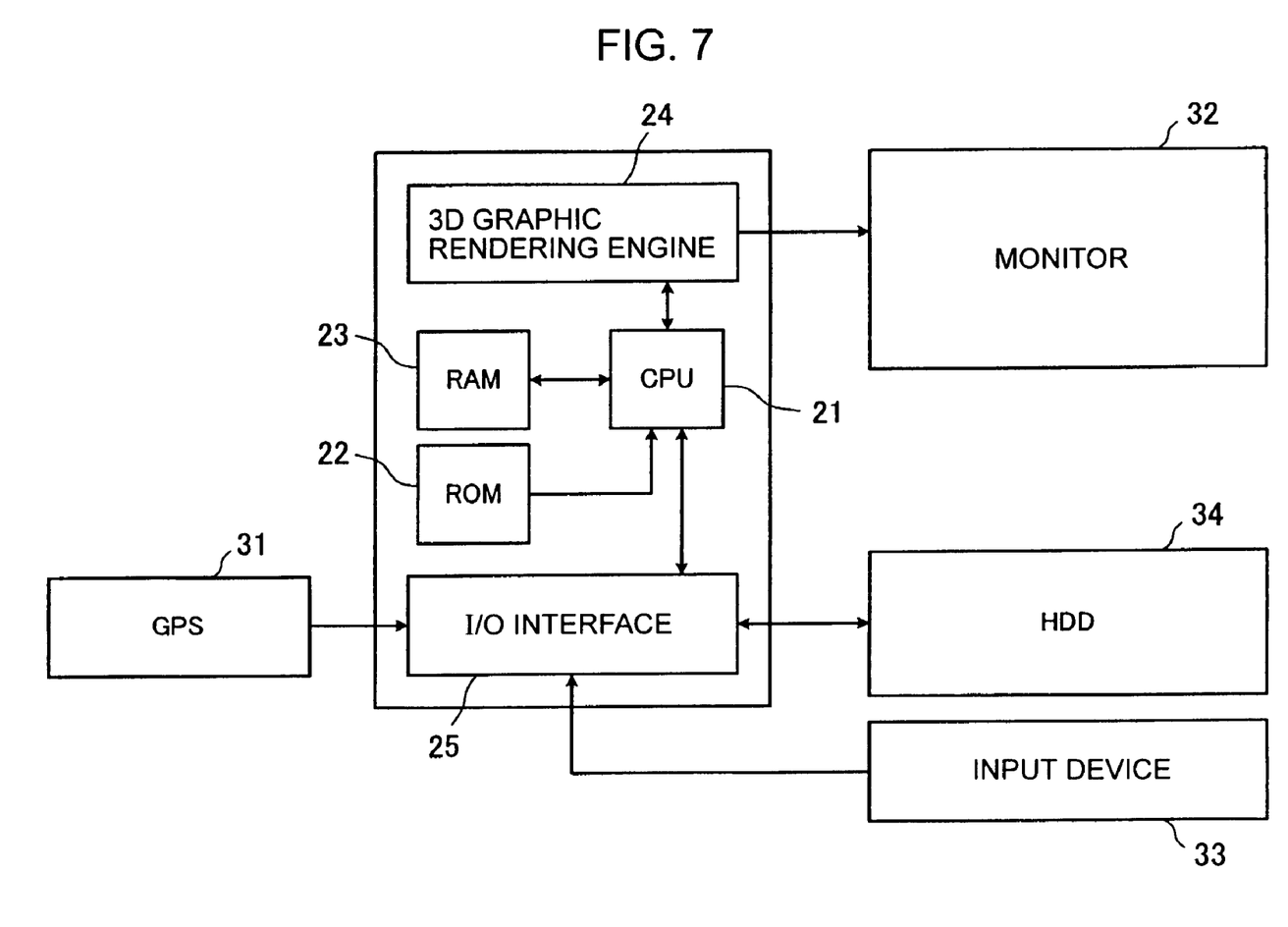
FIG. 7 is a hardware configuration diagram of a vehicle navigation system according to an embodiment of the present invention.

FIG. 7 shows the hardware configuration of the vehicle navigation system.

Referring to FIG. 7, the vehicle navigation system includes a main unit, a global positioning system (GPS) 31, a monitor 32, an input device 33, and a hard disk drive (HDD) 34. The main unit includes a central processing unit (CPU) 21, a read-only memory (ROM) 22, a random access memory (RAM) 23, a 3D graphic rendering engine 24, and an input/output (I/O) interface 25.

The CPU 21 is a control processor for controlling the overall vehicle navigation system. The ROM 22 stores a program to be executed by the CPU 21, and data necessary for processing. The RAM 23 functions as a work area for the CPU 21 to execute the program, and temporarily stores the invoked program or data under processing. For example, texture data is cached in the RAM 23 during rendering.

The 3D graphic rendering engine 24 generates an image signal for displaying various graphics, such as 3D CG images, text, etc., on the monitor 32 in response to a rendering command from the CPU 21. The I/O interface 25 manipulates data inputs and outputs between the CPU 21 and the GPS 31, the input device 33, and the HDD 34.

The GPS 31 has a function for locating the position of the vehicle. The GPS 31 receives signals from GPS satellites via an antenna (not shown), and outputs latitude and longitude information indicating the current position of the vehicle to the CPU 21 via the I/O interface 25.

The monitor 32 is formed of, for example, a liquid crystal display (LCD), and is operable to display an image corresponding to the image signal generated by the 3D graphic rendering engine 24. The monitor 32 is installed on, for example, a dashboard of the vehicle so that the driver or other passengers can see various views including menu, route information, and map data displayed on the monitor 32.

The input device 33 supplies a control signal corresponding to a user input to the CPU 21 via the I/O interface 25. The input device 33 is implemented as, for example, operation keys, a touch panel on the screen of the monitor 32, or a receiver for receiving radio signals or radiation from a remote controller.

The HDD 34 is an external storage device storing 3D map data necessary for generating an animation, route link data for route search, etc. The HDD 34 supplies data and commands to the CPU 21 via the I/O interface 25. The HDD 34 may also function as a work area for the CPU 21 to execute a program. Another external storage device, such as an optical disk, e.g., a digital versatile disk (DVD), may be used. An external storage device with a capacity larger than, for example, several tens of gigabytes, which can be accessed at a high rate, is preferably used.

The main features of the vehicle navigation system are that a route to a destination is searched for based on a departure point, an intermediate point or points, and a destination point specified by user inputs and is displayed, and CG images of a road map and environmental conditions of nearby buildings are displayed on the monitor 32 based on the positional information from the GPS 31 as the vehicle travels on the route. If the CPU 21 determines that the vehicle approaches a certain intersection based on the positional information from the GPS 31, the intersection magnification function is enabled to display on the monitor 32 a 3D animation of the details of the road ahead in a scene passing the intersection.

Figure 8:
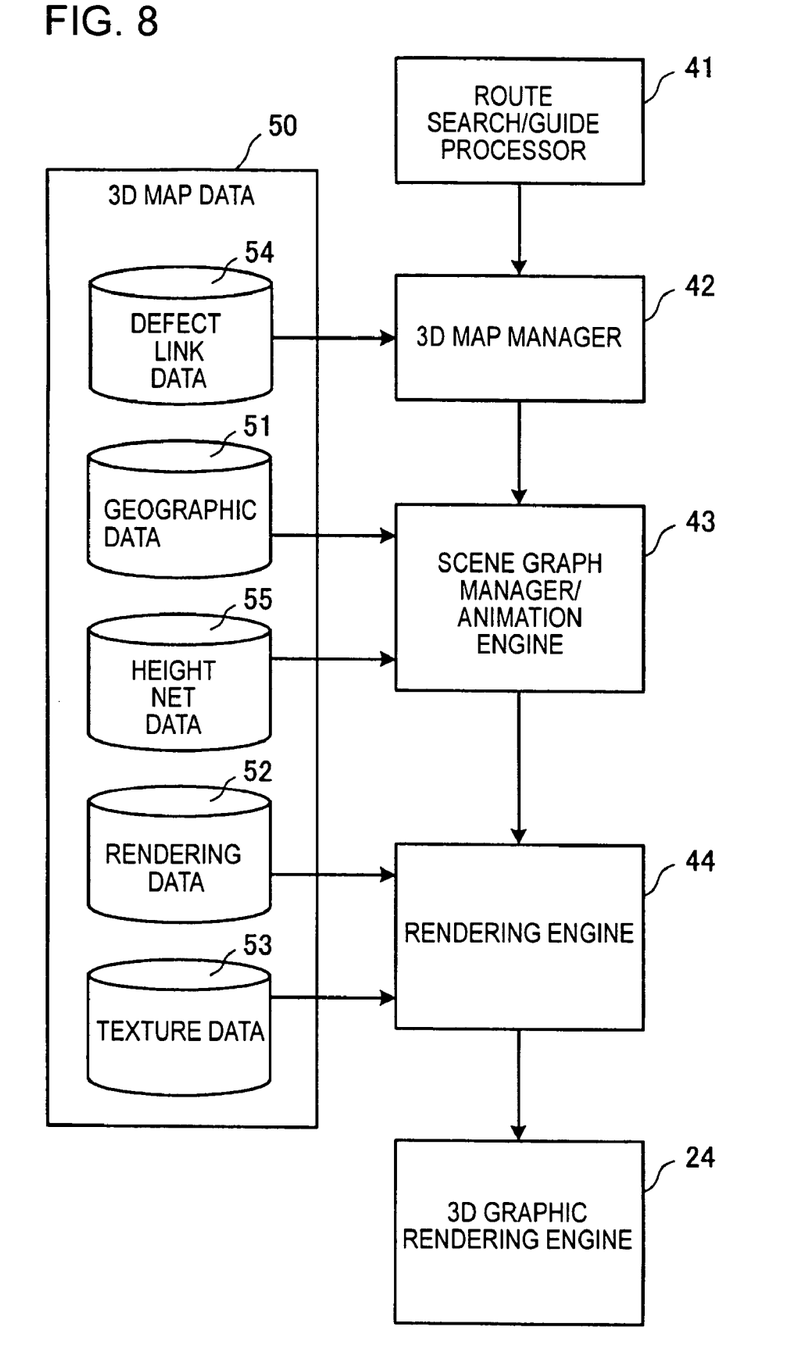
FIG. 8 is a schematic diagram of a rendering function of the vehicle navigation system.

FIG. 8 schematically shows a rendering function of the vehicle navigation system.

As shown in FIG. 8, the vehicle navigation system includes a route search/guide processor 41, a 3D map manager 42, a scene graph manager and animation engine 43, and a rendering engine 44. These functions are implemented by, for example, software executed by the CPU 21. The HDD 34 stores 3D map data 50 in advance. The 3D map data 50 is used for rendering an image when the intersection magnification function is enabled.

The 3D map data 50 includes geographic data 51, rendering data 52, and texture data 53, and these data are generated based on existing general-purpose 3D map data, complying with the specification of the vehicle navigation system.

The geographic data 51 includes latitude and longitude information indicating an area on the map, and shape information of objects located in this area, such as buildings. The geographic data 51 is binary scene graph data in which data for managing the information described above is represented by a tree depending upon the details of a rendered image.

In the rendering data 52, a list of information, such as material, texture, and color, necessary for rendering an object located in a desired area on the map, commands necessary for rendering images, etc., are managed in association with link IDs. The rendering data 52 includes material and color data. The texture data 53 is separately managed so that it can be shared for a plurality of areas. The rendering commands comply with an industrial standard 3D CG library, such as micro GL or OpenGL.

The 3D map data 50 also includes defect link data 54 containing link IDs of a point at which data necessary for rendering images has not be obtained, a point at which data is defective and unreadable, etc. Based on the defect link data 54, it is determined in advance whether or not magnification and display of each intersection is enabled.

The 3D map data 50 also includes height net data 55 containing height (altitude) information of a key point of a route, such as an area covering a given intersection. The height net data 55 is generated based on existing general-purpose route link data. The height information is added to general-purpose 3D map data having no height information, and therefore the heights of the point of view and the point of regard can be set.

In the illustrated embodiment, the 3D map data 50 specific to the intersection magnification function is used to create a more detailed animation only when the vehicle travels through an intersection. Such data may be provided for the entire route and areas near the route so that the same rendering operation is performed on the entire route.

Rendering functions will now be described.

The route search/guide processor 41 performs control to search for a route to a specified destination and to guide a user to the destination based on the position of the vehicle. The route search/guide processor 41 supplies a latitude and longitude information group of the route and a link ID for specifying a next intersection to the 3D map manager 42 based on the positional information from the GPS 31 or user designation.

The 3D map manager 42 refers to the defect link data 54 in the 3D map data 50 to determine whether or not height information and rendering data for executing the intersection magnification function about the intersection specified by the route search/guide processor 41 are stored. If the height information and the rendering data are stored, and a 3D animation of this intersection can be created, the 3D map manager 42 supplies the link ID of the intersection and the latitude and longitude information group of the route to the scene graph manager and animation engine 43.

The scene graph manager and animation engine 43 searches the geographic data 51 for a 3D map covering the position corresponding to the supplied latitude and longitude information group. If the 3D map exists, the height information of the intersection is extracted from the height net data 55 based on the supplied link ID. The point of view and the point of regard are determined based on the latitude and longitude information group and the height information of the route to set a camera parameter. Based on the camera parameter, a tree of the geographic data 51, which is scene graph data, is analyzed to specify a display area, and an animation parameter for rendering an object in this area is set.

The rendering engine 44 loads the rendering data 52 specified by the scene graph manger and animation engine 43 from the 3D map data 50. The texture data 53 specified in the loaded rendering data 52 is also loaded from the HDD 34 and is then cached in the RAM 23. The rendering engine 44 sequentially issues the rendering commands designated by the rendering data 52 based on the loaded data and the animation parameter from the scene graph manager and animation engine 43 to the 3D graphic rendering engine 24.

The 3D graphic rendering engine 24 sequentially generates 3D CG images in response to the rendering commands from the rendering engine 44, and a 3D animation is therefore displayed on the monitor 32.

Figure 9:
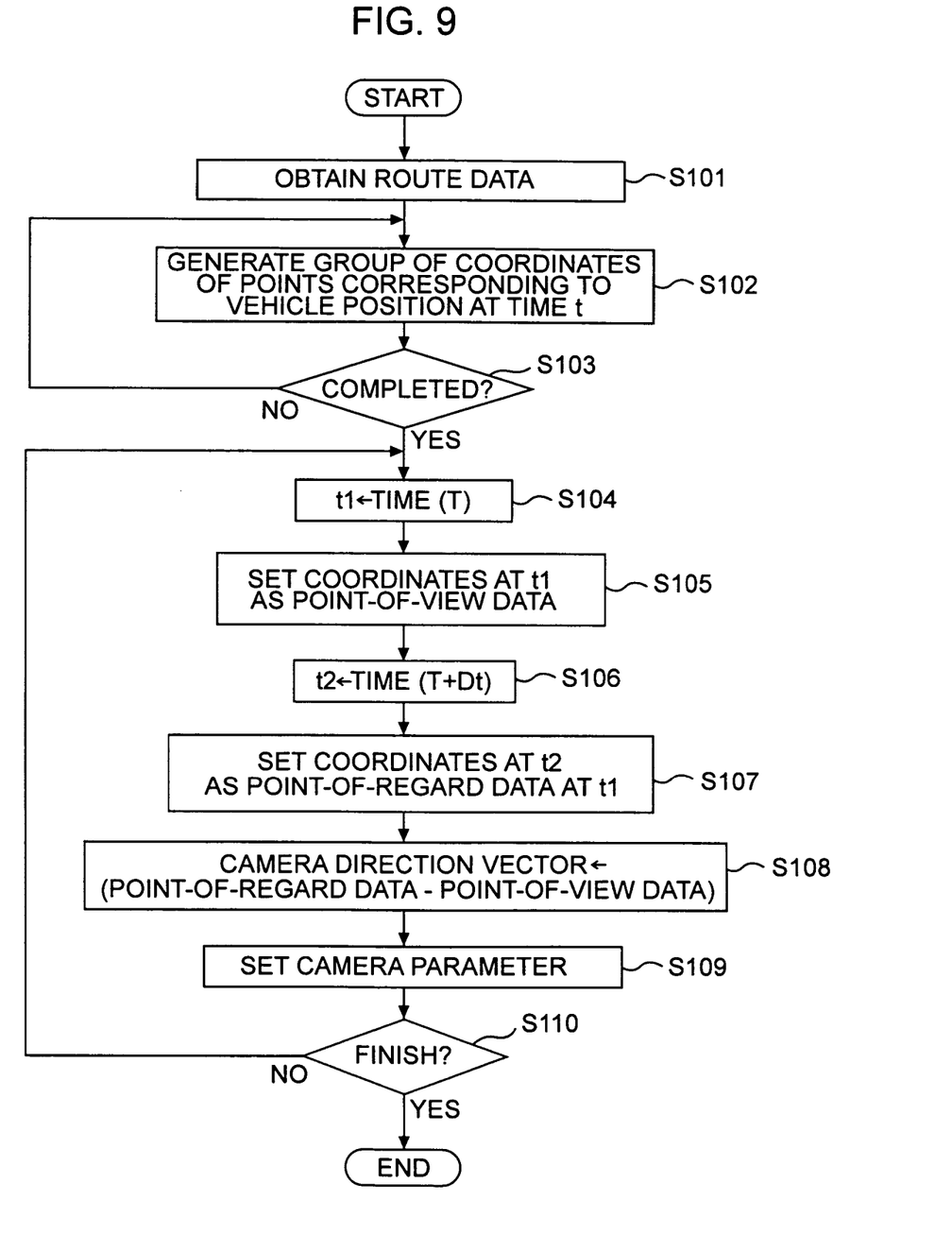
FIG. 9 is a flowchart showing a process for a scene graph manager and animation engine to set a camera parameter when the intersection magnification function is enabled.

FIG. 9 is a flowchart showing a process for the scene graph manger and animation engine 43 to set a camera parameter when the intersection magnification function is enabled.

The process shown in FIG. 9 is performed, for example, when the vehicle approaches within a predetermined distance of a given intersection based on the position of the vehicle from the GPS 31 under the control of the route search/guide processor 41 or when simulation of traveling through the intersection specified by a user input is instructed.

In step S101, route data (i.e., a latitude and longitude information group) of an area covering a given intersection is retrieved from the 3D map manager 42.

In step S102, a group of coordinates of points indicating the position of the vehicle in the intersection area at time t is generated and is temporarily stored in the RAM 23. In a case where the height of the point of view can be set, the coordinates are expressed as three-dimensional coordinates including the coordinate values based on the latitude information and the longitude information and the coordinate value based on the height net data 55.

In step S103, it is determined whether or not the group of coordinates of all points on the route within the intersection area has been generated. If the group of coordinates of all points has not been generated, the process returns to step S102. If the group of coordinates of all points has been generated, the process proceeds to step S104.

In step S104, the time count starts with traveling of the vehicle through the intersection, and time (T) is set to time t1.

In step S105, the coordinates of the point corresponding to the position of the vehicle at time t1 are extracted from the group of coordinates stored in the RAM 23, and are set as point-of-view data at time t1. For example, if a bird's eye view mode is selected, the value of the specified height is added to the coordinates of the point-of-view data.

In step S106, time (T+dT) at which predetermined time has elapsed since the given time (T) is set to time t2.

In step S107, the coordinates of the point corresponding to the position of the vehicle at time t2 are extracted from the group of coordinates stored in the RAM 23, and are set as point-of-regard data at time t1.

In step S108, the point-of-view data is subtracted from the point-of-regard data, and the resulting value is set as a camera direction vector.

In step S109, a camera parameter is set based on the camera direction vector. The scene graph manager and animation engine 43 analyzes the geographic data 51 based on the set camera parameter to specify a display area, and sets an animation parameter. The scene graph manager and animation engine 43 delivers the animation parameter to the rendering engine 44. The rendering engine 44 issues a rendering command to the 3D graphic rendering engine 24, and one frame of 3D CG image in a 3D animation is therefore displayed on the monitor 32.

In step S110, it is determined whether or not the process is finished after the vehicle has passed all points on the route within the intersection area. If the process is not finished, the process returns to step S104, and further processing with respect to next counted time (T) is performed. The processing of steps S104 to S109 is repeatedly performed to display images during traveling through the intersection. Thus, a 3D animation containing scenes viewed in front of the vehicle as the vehicle travels through the intersection is displayed in real-time over time (T). After a period of time for which the vehicle has passed all points on the route within the intersection area, the process ends.

In the process described above, given route data is converted into a group of coordinates of points indicating the positions of the vehicle on the route at predetermined time intervals, and a point of view and a point of regard are determined using the group of coordinates. Alternatively, a group of coordinates may be determined by plotting a route within an area covering an intersection at predetermined distance intervals. Thus, a real-time 3D animation can automatically be generated with low computational load for setting the point of view and the point of regard.

The coordinate value of the height of the point of view set in step S105 can be changed over time to easily execute a high-usability high-entertainment display mode, such as the "bird-to-driver mode" or the "driver-to-bird mode". Such a display mode is executed based on the 3D map data 50 to which the height information is added by the height net data 55. Thus, realistic images can be displayed.

In the embodiments described above, an intersection magnification function for displaying a 3D animation of the detailed road conditions ahead is enabled only when the vehicle travels through an intersection, and a point of view and a point of regard are determined from route information. According to an embodiment of the present invention, a 3D animation traveling on the route within areas other than an intersection area may constantly be displayed. In this case, for example, each time the vehicle enters a new area on the map or the route, the process shown in FIG. 9 may be performed based on route data of this area. Thus, a realistic 3D animation can be generated regardless of the route configuration with low computational load for determining a point of view and a point of regard to calculate a camera parameter.

The processing functions described above are executed by a computer. A program describing the processing functions of the vehicle navigation system is provided. The program is executed by a computer to achieve the processing functions on the computer. The program describing the processing functions may be recorded in a computer-readable recording medium, such as a magnetic recording device, e.g., an HDD, an optical disk, e.g., a DVD or a CD-ROM (Compact Disc-ROM), a magneto-optical recording medium, e.g., a magneto-optical (MO) disk, or a semiconductor memory, e.g., a flash memory.

The program is distributed by, for example, offering or selling portable recording media recording the program, such as DVDs and CD-ROM disks. The program may be stored in a storage device of a server computer, and may be transmitted via a network from the server computer to other computers.

When a computer is to execute the program that is recorded in a portable recording medium or that is transmitted from the server computer, for example, the computer stores the program in a storage device of the computer. The computer reads the program from the storage device, and executes a process in accordance with the program. The computer may also read the program directly from the portable recording medium, and may execute a process in accordance with the program. The computer may also execute a process in accordance with a program each time the program is transmitted from the server computer.

The present invention is not limited to the vehicle navigation system described above, and is also applicable to other apparatuses capable of displaying a 3D animation containing scenes tracking a moving object, such as various navigation systems, e.g., human navigation systems, and computer games, namely, apparatuses in which a route of a moving object is preset.

It should be understood by those skilled in the art that various modifications, combinations, sub-combinations and alterations may occur depending on design requirements and other factors insofar as they are within the scope of the appended claims or the equivalents thereof.

What is claimed is:

1. An animation generating apparatus for generating a three-dimensional animation tracking a moving object, the apparatus comprising:
   camera parameter setting means for setting a point of regard and a point of view based on a current position of the moving object using route data indicating a route of the moving object so that the point of regard is a position of the moving object located on the route, and the point of view is located on the route of the moving object in a first direction and at a fixed distance behind the point of regard; and
   rendering means for generating an image directed from the point of view to the point of regard when the moving object changes direction by retrieving necessary rendering data from three-dimensional map data based on the point of regard and the point of view set by the camera parameter setting means,
   wherein, when the direction of the moving object changes in a second direction perpendicular to the first direction, the point of view remains located on the route of the moving object traveling in the first direction at the fixed distance behind the point of regard and directed to the point of regard.

2. The apparatus according to claim 1, further comprising route data converting means for converting the route data that is acquired in advance into a group of coordinates of points indicating positions of the moving object on the route at certain time intervals,
   wherein the camera parameter setting means sets the point of view to a point in the group of coordinates of points, the point in the group of coordinates of points indicating the position of the moving object, and the position of the moving object is at a location on the route ahead of the point of view by a predetermined time.

3. The apparatus according to claim 1, further comprising route data converting means for converting the route data that is acquired in advance into a group of coordinates of points located at certain distance intervals on the route,
   wherein the camera parameter setting means sets the point of view to a point in the group of coordinates of points which is converted by the route data converting means, the point being at a position a predetermined number of points behind the point of regard.

4. The apparatus according to claim 1, wherein the three-dimensional map data and the route data include height information, and the camera parameter setting means sets the point of view at a certain height from a point behind the point of regard on the route.

5. The apparatus according to claim 4, wherein the height of the point of view from the route is arbitrarily set according to a movement of the moving object.

6. The apparatus according to claim 4, wherein the three-dimensional map data includes point height data indicating the height of points on a map specified by two-dimensional positional information, and
   the camera parameter setting means sets the point of view and the point of regard based on three-dimensional route data having a combination of two-dimensional positional information of a point on the route specified by the route data and height information of the point, the height information being extracted from the point height data.

7. The apparatus according to claim 1, further comprising route data converting means for converting the route data that is acquired in advance into a group of coordinates of points indicating positions of the moving object on the route at certain time intervals,
   wherein the camera parameter setting means sets a point in the group of coordinates of points indicating a position of the moving object at a first time as point-of-view data, and
   wherein the camera parameter setting means sets a point in the group of coordinates of points indicating a position of the moving object at a later second time as point-of-regard data at the first time.

8. An animation generating method for generating a three-dimensional animation tracking a moving object, comprising:
   setting a point of regard and a point of view based on a current position of the moving object using route data indicating a route of the moving object so that the point of regard is a position of the moving object located on the route, and the point of view is located on the route of the moving object in a first direction and at a fixed distance behind the point of regard;
   generating an image directed from the point of view to the point of regard when the moving object changes direction by retrieving necessary rendering data from three-dimensional map data based on the set point of regard and the set point of view; and keeping the point of view directed to the point of regard and positioned on the route of the moving object traveling in a first direction at the fixed distance behind the point of regard when the direction of the moving object changes in a second direction perpendicular to the first direction.

9. The method according to claim 8, further comprising converting the route data that is acquired in advance into a group of coordinates of points indicating positions of the moving object on the route at certain time intervals,
   wherein the setting sets the point of view to a point in the group of coordinates of points, the point in the group of coordinates of points indicating the position of the moving object, which is at a location on the route ahead of the point of regard by a predetermined time.

10. The method according to claim 8, further comprising converting the route data that is acquired in advance into a group of coordinates of points located at certain distance intervals on the route,
   wherein the setting sets the point of view to a point in the group of coordinates of points which is converted by the route data converting means, the point being at a position a predetermined number of points behind the point of regard.

11. The method according to claim 8, wherein the three-dimensional map data and the route data include height information, and the setting sets the point of view at a certain height from a point behind the point of regard on the route.

12. The method according to claim 11, wherein the height of the point of view from the route is arbitrarily set according to a movement of the moving object.

13. The method according to claim 8, wherein the three-dimensional map data includes point height data indicating the height of points on a map specified by two-dimensional positional information, and
   the setting sets the point of view and the point of regard based on three-dimensional route data having a combination of two-dimensional positional information of a point on the route specified by the route data and height information of the point, the height information being extracted from the point height data.

14. A computer readable medium storing an animation generating program causing a computer to execute a process for generating a three-dimensional animation tracking a moving object, the program causing the computer to function as:
   camera parameter setting means for setting a point of regard and a point of view based on a current position of the moving object using route data indicating a route of the moving object so that the point of regard is a position of the moving object located on the route, and the point of view is located on the route of the moving object in a first direction and at a fixed distance behind the point of regard; and
   rendering control means for issuing a rendering command to generate an image directed from the point of view to the point of regard when the moving object changes direction by retrieving necessary rendering data from three-dimensional map data based on the point of regard and the point of view determined by the camera parameter setting means,
   wherein, when the direction of the moving object changes in a second direction perpendicular to the first direction, the point of view remains located along on the route of the moving object traveling in a first direction at the fixed distance behind the point of regard and directed to the point of regard.

15. The computer readable medium according to claim 14, wherein the program further causes the computer to function as route data converting means for converting the route data that is acquired in advance into a group of coordinates of points indicating positions of the moving object on the route at certain time intervals, and
   wherein the camera parameter setting means sets the point of view to a point in the group of coordinates of points, the point in the group of coordinates of points indicating the position of the moving object, which is at a location on the route ahead of the point of regard by a predetermined time.

16. The computer readable medium according to claim 14, wherein the program further causes the computer to function as route data converting means for converting the route data that is acquired in advance into a group of coordinates of points located at certain distance intervals on the route, and
   wherein the camera parameter setting means sets the point of view to a point in the group of coordinates of points which is converted by the route data converting means, the point being at a position a predetermined number of points behind the point of regard.

17. The computer readable medium according to claim 14, wherein the three-dimensional map data and the route data include height information, and the camera parameter setting means sets the point of view at a certain height from a point behind the point of regard on the route.

18. The computer readable medium according to claim 17, wherein the height of the point of view from the route is arbitrarily set according to a movement of the moving object.

19. The computer readable medium according to claim 17, wherein the three-dimensional map data includes point height data indicating the height of points on a map specified by two-dimensional positional information, and
   the camera parameter setting means sets the point of view and the point of regard based on three-dimensional route data having a combination of two-dimensional positional information of a point on the route specified by the route data and height information of the point, the height information being extracted from the point height data.

20. An animation generating apparatus for generating a three-dimensional animation tracking a moving object, the apparatus comprising:
   a camera parameter setting section configured to set a point of regard and a point of view based on a current position of the moving object using route data indicating a route of the moving object so that the point of regard is a position of the moving object located on the route, and the point of view is located on the route of the moving object in a first direction and at a fixed distance behind the point of regard; and
   a rendering processor configured to generate an image directed from the point of view to the point of regard when the moving object changes direction by retrieving necessary rendering data from three-dimensional map data based on the point of regard and the point of view set by the camera parameter setting section,
   wherein, when the direction of the moving object changes in a second direction perpendicular to the first direction, the point of view remains located on the route of the moving object traveling in a first direction at the fixed distance behind the point of regard and directed to the point of regard.

* * * * *